United States Patent [19]
Gold et al.

[11] Patent Number: 4,944,333
[45] Date of Patent: Jul. 31, 1990

[54] CYLINDER RUPTURE VESSEL WITH CLAMPS FOR IMMOBILIZING A CONTAINER INSIDE THE VESSEL

[75] Inventors: Jeffrey W. Gold, Atlanta, Ga.; Dan A. Nickens, Orlando, Fla.

[73] Assignee: Earth Resources Consultants, Inc., Orlando, Fla.

[21] Appl. No.: 57,083

[22] Filed: Jun. 3, 1987

Related U.S. Application Data

[63] Continuation-in-part of Ser. No. 669,537, Nov. 8, 1984, Pat. No. 4,690,180.

[51] Int. Cl.$^5$ .......................... B65B 31/00; B65B 7/24
[52] U.S. Cl. .......................................... 141/51; 141/65; 141/329; 141/368; 414/412; 30/448; 222/83.5; 222/86; 222/397
[58] Field of Search ..................... 222/81–83, 222/83.5, 85, 86, 397; 414/412; 30/401–403, 444, 448; 141/51, 65, 329, 330, 311 R, 319, 368, 231

[56] References Cited

U.S. PATENT DOCUMENTS

| | | | |
|---|---|---|---|
| 1,371,103 | 3/1921 | Lucas | 220/314 |
| 1,591,932 | 7/1926 | Young | 141/66 X |
| 2,051,981 | 8/1936 | Bowman | 222/89 |
| 2,496,606 | 2/1950 | Smith | 30/400 X |
| 3,333,735 | 8/1967 | Odasso | 222/82 X |
| 3,486,840 | 12/1969 | Burton et al. | 141/85 X |
| 3,662,791 | 5/1972 | Puscitti | 141/65 |
| 3,993,231 | 11/1976 | Boynton et al. | 222/87 |
| 4,166,481 | 9/1979 | Farris et al. | 141/1 |
| 4,213,479 | 7/1980 | Pearson | 141/65 X |
| 4,274,453 | 6/1981 | Lee | 141/1 |
| 4,344,467 | 8/1982 | Lahde | 141/66 |
| 4,349,054 | 9/1982 | Chipman et al. | 141/98 X |
| 4,386,637 | 10/1983 | Buchanan et al. | 141/65 |
| 4,407,341 | 10/1987 | Feldt et al. | 141/97 |
| 4,452,377 | 6/1984 | Hurley et al. | 141/65 |
| 4,500,015 | 2/1985 | Penney | 222/87 |
| 4,690,180 | 9/1987 | Gold | 141/51 |

FOREIGN PATENT DOCUMENTS 1607991 10/1970 Fed. Rep. of Germany ........ 141/65

*Primary Examiner*—Ernest G. Cusick
*Attorney, Agent, or Firm*—Finnegan, Henderson Farabow, Garrett & Dunner

[57] ABSTRACT

A cylinder rupture vessel for release and recontainerization of hazardous contents of compressed gas cylinders is defined by an enclosed chamber which accommodates a plurality of bearing surfaces for supporting and positioning a target cylinder thereon. A puncture spike disposed within the chamber is adapted to puncture the target cylinder at its mid-section, thereby releasing its contents. Connections are provided communicating with the enclosed chamber for evacuating and recontainerizing the contents released by a punctured cylinder without release of the contents into the environment. All of the cylinder processing operations may be provided remotely.

10 Claims, 12 Drawing Sheets

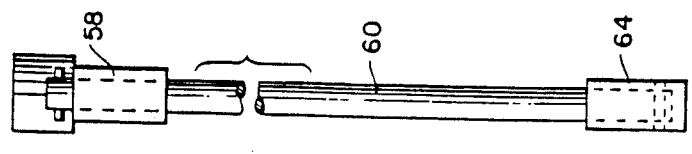
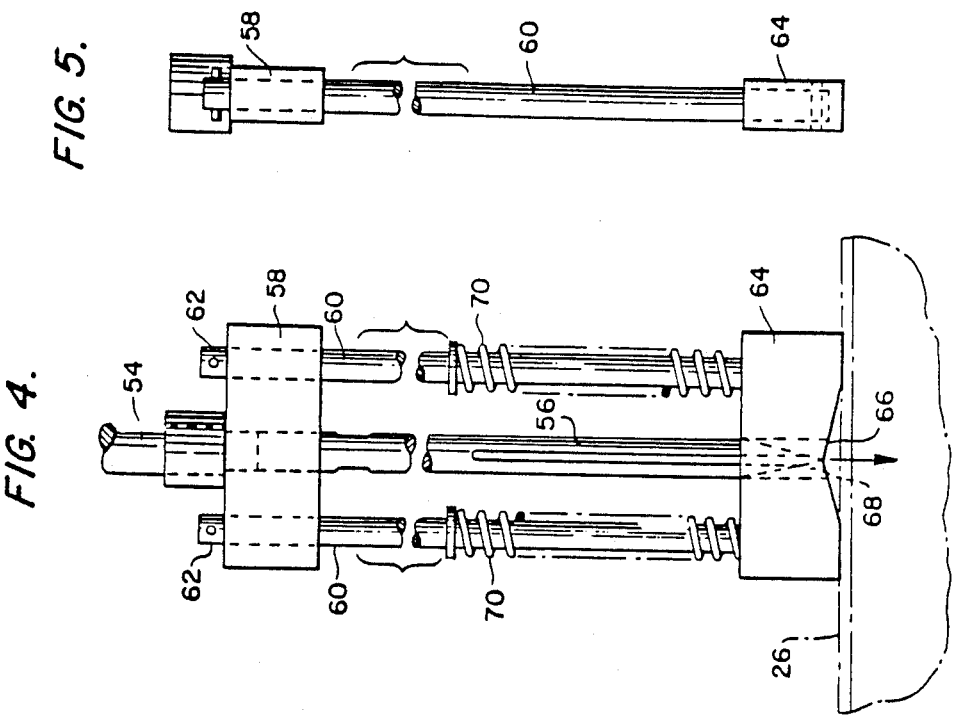
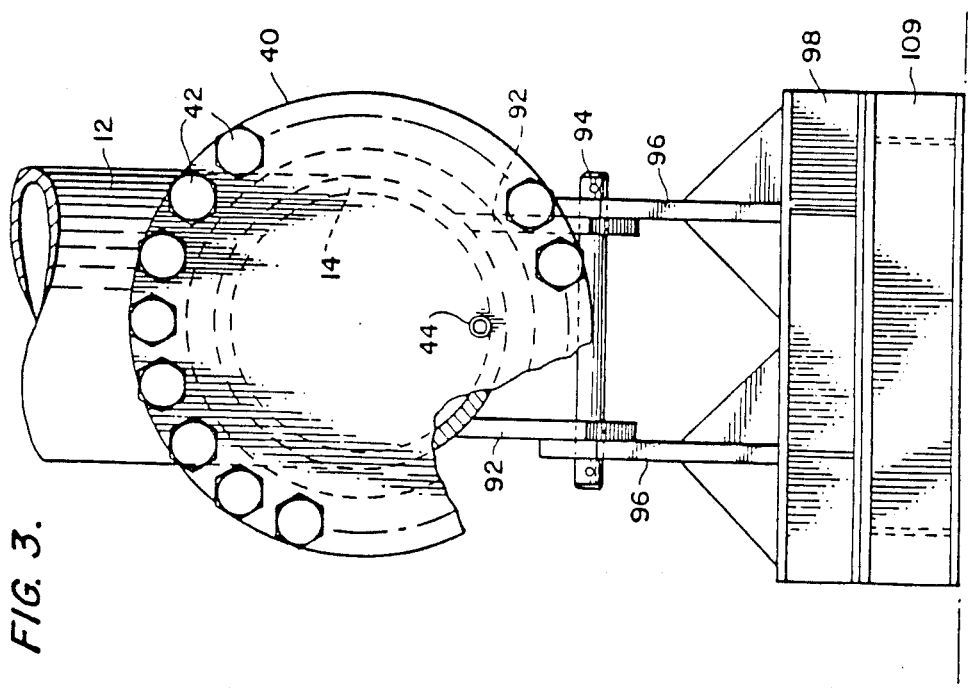

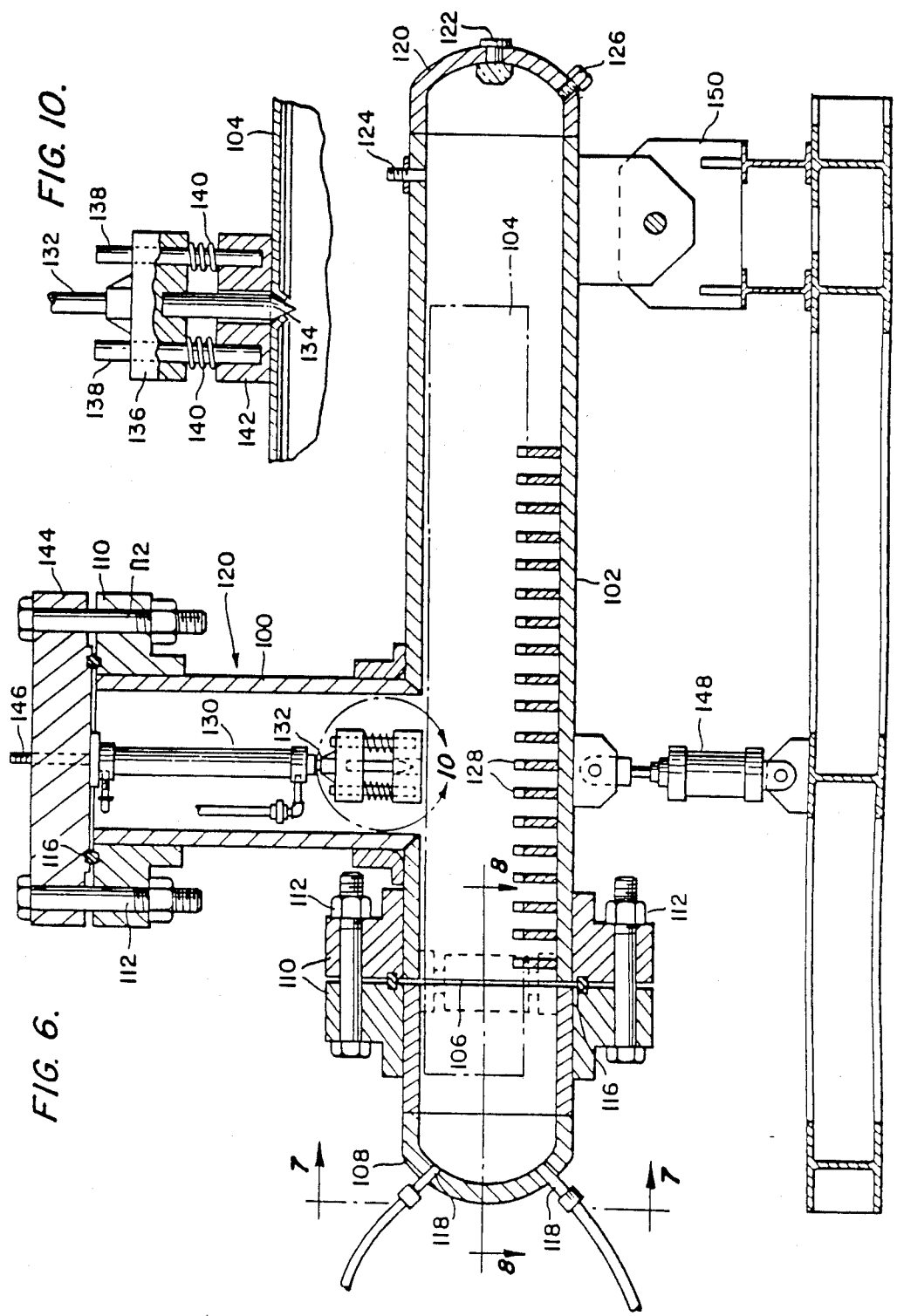

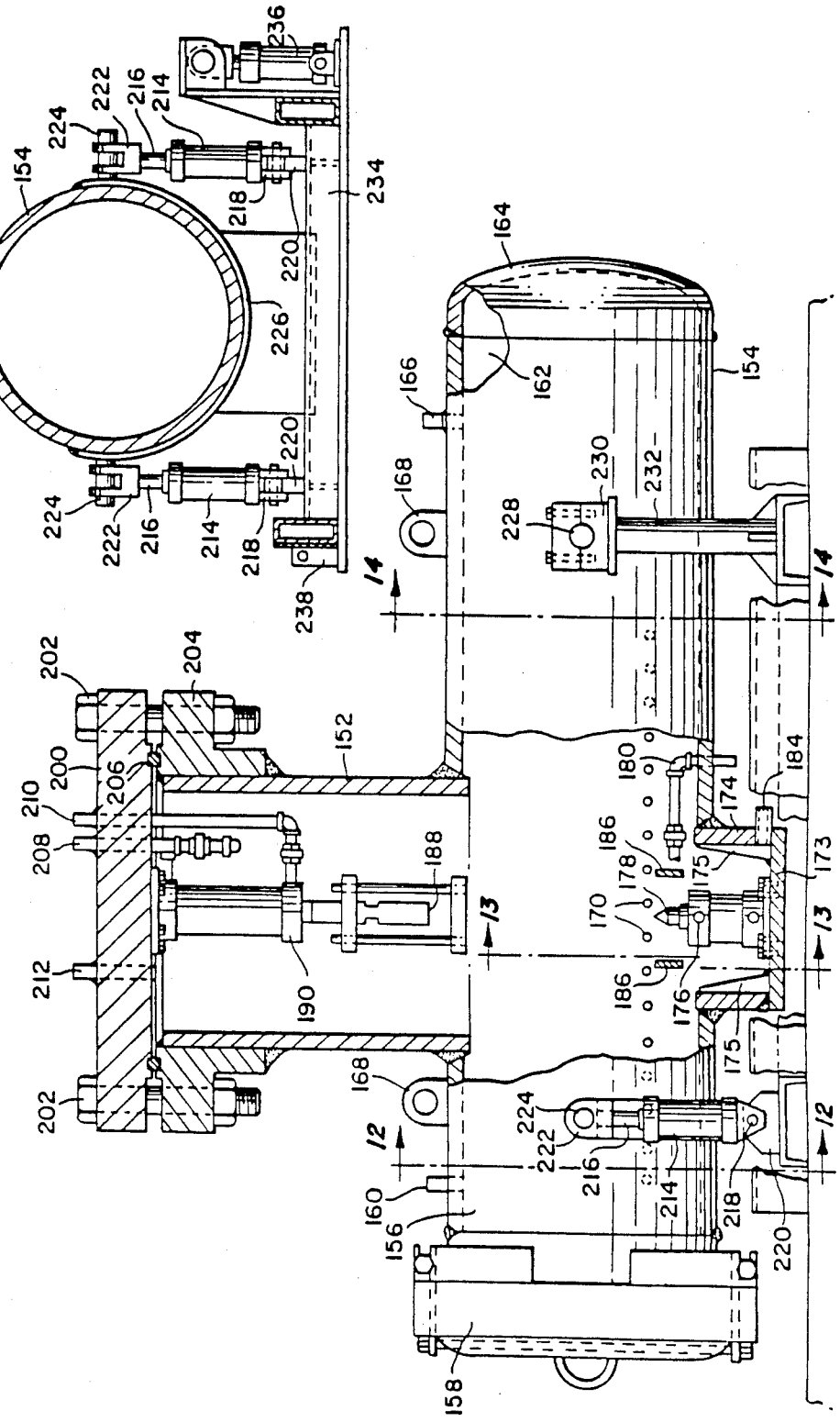

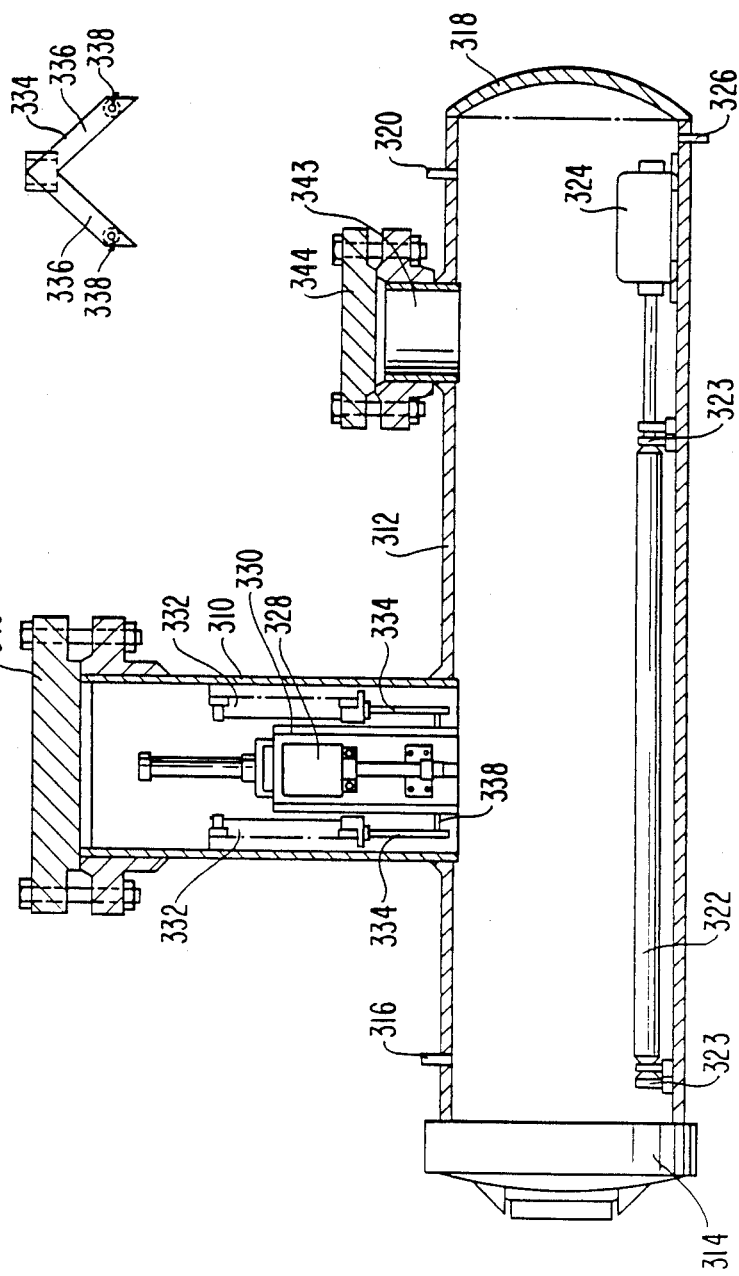

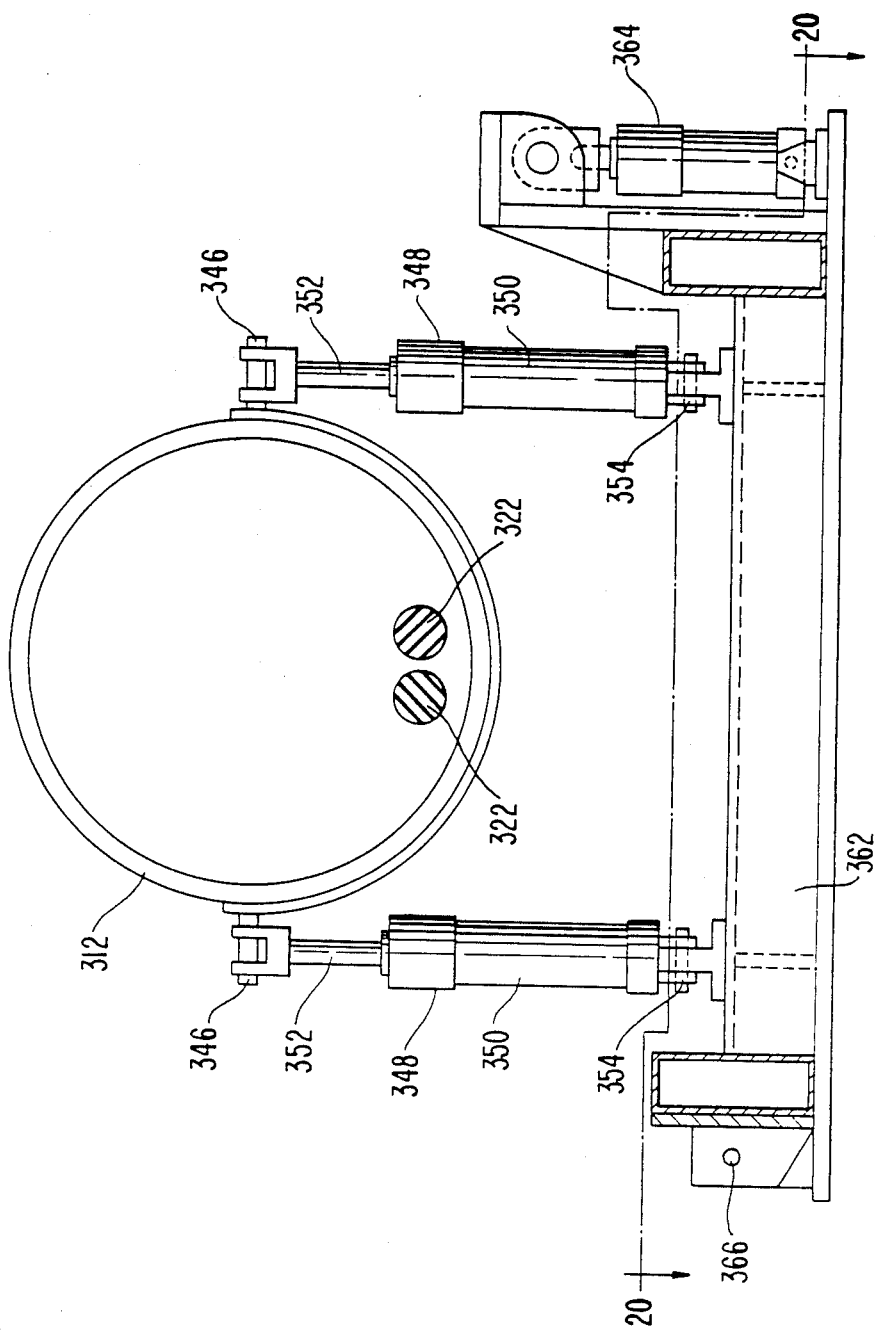

CYLINDER RUPTURE VESSEL WITH CLAMPS FOR IMMOBILIZING A CONTAINER INSIDE THE VESSEL

This application is a continuation-in-part of applicant's co-pending patent application Ser. No. 669,537, filed Nov. 8, 1984, now U.S. Pat. No. 4,690,180.

BACKGROUND OF THE INVENTION

1. Field of the Invention

The invention relates to the field of hazardous waste management, and in particular, to the recontainerization and disposal of the contents of deteriorated compressed gas cylinders. Compressed gas cylinders in deteriorated condition and containing unknown and potentially dangerous gases have been frequently discovered at industrial plants, research facilities and hazardous waste sites. The compressed gas cylinders presently located represent only a fraction of those still to be discovered. The inability to safely identify the contents of deteriorated compressed gas cylinders makes it impossible to transport and dispose of such cylinders in a manner safe to both the involved personnel and to the environment. The present invention was developed in response to the demand for technology to ascertain the nature of the contents of deteriorated gas cylinders and to provide a means whereby these cylinders could be safely sampled recontainerized and disposed. Thus, the present invention provides a vessel for the safe release of the entire contents of any gas cylinder under carefully controlled conditions, allowing for the safe withdrawal and recontainerization of both gaseous and liquid phases of any material released from the cylinder.

2. Description of the Prior Art

Until now, the principal technique for disposing of known, and sometimes even unknown, compressed gas cylinders has been through detonation. This method provides a quick, relatively inexpensive manner of destroying small numbers of cylinders, particularly those containing pyrophoric gases. Severe disadvantages become evident, however, when detonating gas cylinders with unknown contents. Among the principal disadvantages of detonation for this type of cylinder are inadequate destruction of cylinder contents when the contained gas is of a non-pyrophoric nature, incomplete combustion of cylinder contents, and the creation of undesirable combustion by-products. Even more importantly, detonation of cylinders whose contents are unknown may result in the uncontrolled release of bacteriological and virological agents, as well as radioactive gases, into the environment. Finally, control over the entire process is hampered by the inadequate real-time air monitoring instrumentation currently available.

In the agricultural field, various devices have been utilized for the transfer of toxic liquids such as pesticides and herbicides. U.S. Pat. No. 3,993,221 to Boynton et al shows a closed system chemical transfer apparatus for transferring concentrated chemical insecticide from a container to a main water tank for mixing with the water to provide a spray solution. The apparatus consists of a chamber for receiving and enclosing an insecticide container. The container is penetrated by a punch and its contents allowed to flow out of the bottom of the enclosing chamber to a water tank. Rinsing water flows out through the punch and a plunger is activated to crush the container.

A closed liquid transfer system for agricultural chemicals is also shown in U.S. Pat. No. 4,166,481. A closed, toxicant-filled container is placed within a sealed chamber. The container is punctured by a probe located in the chamber but operable from outside the chamber by a lever. The released toxicant thereafter flows from the sealed chamber to a transfer tank.

U.S. Pat. No. 4,407,341 to Feldt et al is directed to an apparatus for removing the contents of damaged aerosol containers of the type having a valve insert. An aerosol can to be emptied is placed with its valve side down in a casing and centered over a clamp means. The clamp is drawn downward to detach the valve seat insert. The gas released from the open can flows into the casing and thereafter to a discharge pipe.

The concept of removing the contents of a container by puncturing the container and subsequently withdrawing the contents is further shown in U.S. Pat. Nos. 4,274,453 and 2,051,981.

None of the prior art references is directed to a cylinder rupture vessel for sampling, recontainerization and disposal of hazardous waste gas cylinders of unknown contents. The prior art does not show a mechanism for handling a wide variety of gases and liquids with corrosive, reactive, explosive, poisonous or flammable characteristics. Furthermore, the prior art does not teach or suggest a cylinder rupture vessel capable of accommodating gas cylinders of diverse sizes and configurations. The prior art also does not teach or suggest apparatus for safely withdrawing the contents of compressed gas cylinders having a very high pressure, while maintaining high factors of safety. It is also not known in the art to provide a cylinder rupture vessel wherein all processing operations may be performed remotely.

The present invention overcomes these and other deficiencies in the prior art by providing a waste cylinder rupture vessel that houses a target compressed gas cylinder for sampling, recontainerization, and disposal of the cylinder contents by virtue of cylinder processing operations performed at a control panel outside of the sealed structure. The design and operating protocols of the cylinder rupture vessel assure the highest possible degree of safety for handling compressed gas cylinders in any condition and ensure adequate isolation of hazardous gases from the environment during the entire processing operation. The present invention may also be utilized for the safe and efficient withdrawal, sampling and recontainerization of the contents of pressurized and non pressurized drums and other similar containers.

SUMMARY OF THE INVENTION

In accordance with the invention, a mobile, airtight cylinder rupture vessel is provided having an access member at its forward end for communicating with the vessel interior so as to place therewithin a target compressed gas cylinder whose contents are to be disposed. Rollers or V-shaped bearing surfaces located in the bottom interior of the vessel along the elongate length thereof support and center a compressed gas cylinder of any size. A pneumatically, hydraulically or electrically actuated drill or puncture member is located in the upper portion of the vessel so as to be disposed above a target compressed gas cylinder resting on said bearing surfaces. Hydraulic clamps are adapted to be lowered over the cylinder to immobilize the cylinder during the puncture operation. A second, similar puncture member may be disposed below the upper puncture member and beneath the bearing surfaces.

Subsequent to loading a target compressed gas cylinder into the cylinder rupture vessel, the access member is sealed and air is purged from the vessel interior by means of a vacuum pump communicating with a vacuum connection provided in the wall of the vessel. An inert gas is introduced into the vessel through purge connections until the atmosphere inside the cylinder rupture vessel is completely inert. Alternatively, a supercooled liquid may be used as the media for the puncture operation.

The puncture operation is performed by actuating the drill or the hydraulic cylinder and piston for the puncture member, located in the vessel interior, for downward movement toward the target cylinder. When a puncture spike is utilized, a centering block, which moves with the piston and the puncture member along cylindrical guide rods against the force of compression springs, holds the cylinder in place and guides the puncture member into the cylinder. The centering block rests on the upper wall of the target cylinder to secure the target cylinder prior to penetration and to prevent the ruptured target cylinder from traveling upward with the puncture member when the piston is retracted. Downward movement of the piston or drill results in penetration of at least the top wall of the target cylinder, thereby releasing the gas and/or liquid contained therein. The roller bearing surfaces may be adapted for rotation so as to allow the target cylinder to be inverted to facilitate drainage. A closed-circuit video monitoring system may be installed in the vessel to verify and monitor the puncture sequence. Temperatures and pressures are also monitored through sensors.

The cylinder rupture vessel is capable of being tilted along its longitudinal axis in both an upward and downward direction off its normally horizontal plane by means of hydraulic support assembly located beneath the forward end of the vessel. Tilting the vessel facilitates the removal of liquid released from the punctured cylinder and from the vessel through a drainage port located in the vessel wall. Liquid drained out of the cylinder rupture vessel is recontainerized along with any gas that had volatilized from the liquid.

An analytical system is connected to a sampling port by means of a valve for direct sample extraction and analysis of the vessel contents. The analytical system incorporates standard chemicals methodologies for identification of the gases or liquids, including mass spectrometry, photoionization detectors, gas chromatography and specific compound detectors.

Gases present in the cylinder rupture vessel following the rupture sequence are evacuated through the vacuum connection, utilizing a vacuum pump in series with a compressor. Various filters, dry scrubbers, absorbents or pyrolizers (reactors) may be employed in line before the vacuum pump to remove reactive gases or particulates. Once a vacuum is created inside the vessel, inert gas is reintroduced through the purge connections. The purge gas is also containerized and air is then allowed to enter the cleaned vessel. The cylinder rupture vessel will be safe to open after complete pressure equalization has occurred.

Gas withdrawn from the vessel is sampled and identified. The gas may then be pumped into gas cylinders treated, or, for innocuous gases, vented. Recontainerized gases are properly staged for disposal. If liquids have been released, the interior of the cylinder rupture vessel is triple rinsed with a solvent solution. The rinsate is then containerized and staged for disposal. The ruptured cylinders are removed from the vessel and properly disposed.

All cylinder processing operations, including gas purge, introduction of inert gas, activation of the drill or puncture member, evacuation and tilting of the vessel and closed-circuit video monitoring for verifying the puncture sequence are performed at a control panel located outside of the vessel and other secondary containment structures. The entire vessel, vacuum and compressor systems may be located in a sealed, pressure-tight room inside of a semi-van.

Thus, a principal object of the invention is to provide a safe methodology for the sampling and recontainerization or treatment of compressed gases and liquids.

An additional object of the invention is to provide an environmentally acceptable manner of disposing of deteriorated compressed gas cylinders having unknown contents.

It is an object of the invention to provide a means for the safe release of the entire contents of gas cylinders of various sizes, configurations and pressure.

It is a further object of the invention to allow safe withdrawal and recontainerization of both gaseous and liquid phases of any material released from ruptured gas cylinders An additional object of the invention is to provide a cylinder rupture vessel having a high factor of safety.

Another object of the invention is to provide a mechanism for releasing and recontainerizing the contents of cylinders with inoperable or unsafe valves.

It is an object of the invention to dispose of gas cylinders by means wherein hazardous gases are isolated from the environment and from personnel.

Another object of the invention is to provide a cylinder rupture unit that is mobile.

A further object of the invention is to provide a cylinder rupture unit wherein all of the target cylinder processing operations are performed by remote control from outside of the vessel.

An additional object of the invention is to dispose of compressed gas cylinders having a very high pressure.

Another object of the invention is to withdraw, sample and recontainerize the contents of non-pressurized drums and other similar containers.

The above-mentioned and other features and objects of this invention and the manner of attaining them will become apparent and the invention itself will be best understood by the following description of several embodiments of the invention taken in conjunction with the accompanying drawings.

BRIEF DESCRIPTION OF DRAWINGS

FIG. 3 is an end elevational view of a portion of the waste cylinder rupture vessel of FIG. 1, such view being taken along line 3—3 of FIG. 1 and further being taken on an enlarged scale;

FIG. 4 is a front elevational view of the puncture spike utilized within the waste cylinder rupture vessel of FIG. 1, such view being taken along line 4—4 of FIG. 1 and further being taken on an enlarged scale;

FIG. 5 is a side view of the puncture spike shown in FIG. 4;

FIG. 6 is vertical cross-sectional view through a second alternative embodiment of a waste cylinder rupture vessel constructed in accordance with the invention;

FIG. 10 is a front elevational view of the punch assembly employed with the waste cylinder rupture unit of FIG. 6, such view being taken within the insert "10" in FIG. 6, and further being taken on an enlarged scale;

FIG. 11 is a vertical cross-sectional view through a third alternative embodiment of a waste cylinder rupture vessel constructed in accordance with the invention;

FIG. 12 is a vertical cross-sectional view taken through a portion of the waste cylinder rupture vessel of FIG. 11, such view being taken along line 12—12 of FIG. 11 and further being taken on a reduced scale;

FIG. 16 is a side sectional view of the preferred embodiment for the cylinder rupture vessel housing;

FIG. 18 is a front sectional view of the lower housing portion shown supported by the hydraulic support assemblies and the frame;

FIG. 21 is a front plan view of a clamp member.

DESCRIPTION OF THE PREFERRED EMBODIMENTS

Figure 1:
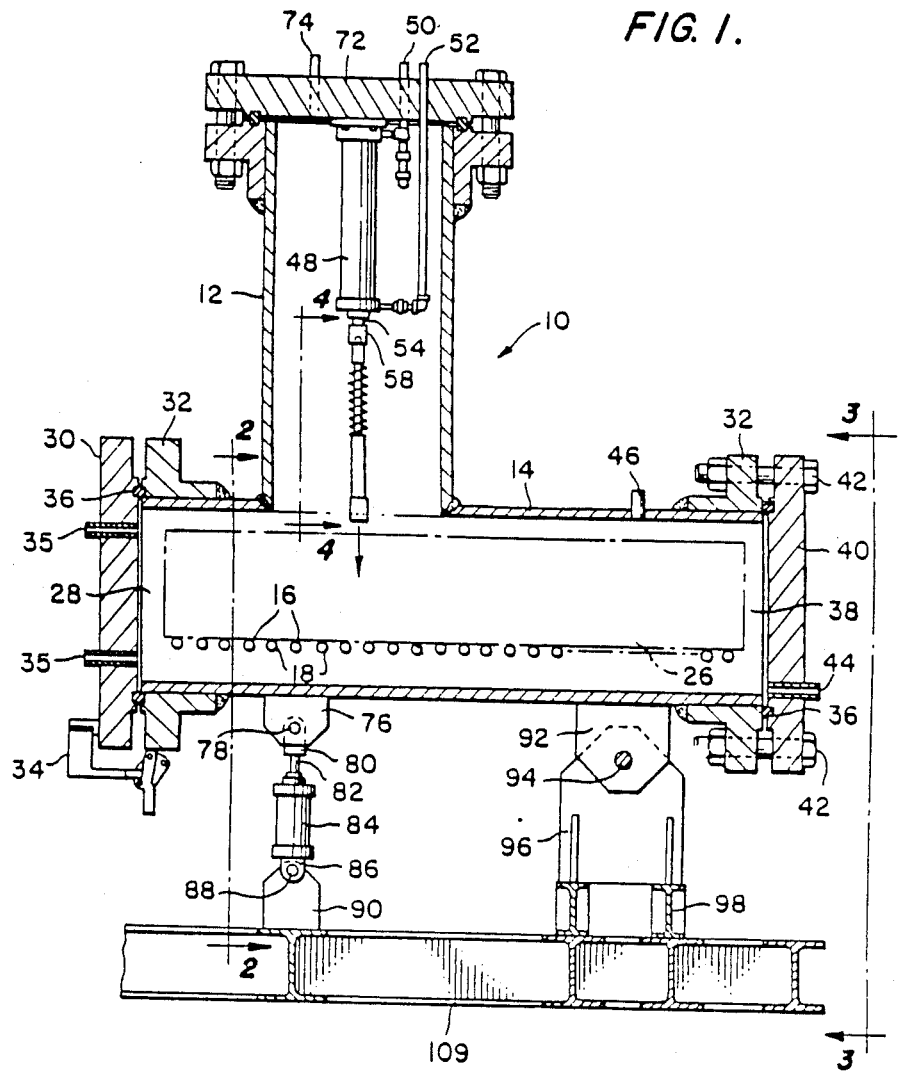
FIG. 1 is a vertical cross-sectional view through a first embodiment of a waste cylinder rupture vessel constructed in accordance with the invention.

As shown in FIG. 1, a first embodiment of the cylinder rupture vessel of the present invention, indicated generally at 10, comprises a mobile, high-strength steel welded pressure vessel housing having a cylindrically shaped upper housing portion 12 integral with and disposed vertically above a horizontal cylindrically shaped lower housing portion 14. Together, upper and lower housing portions 12 and 14 define a chamber for processing a target compressed gas cylinder 26 received therein.

Figure 2:
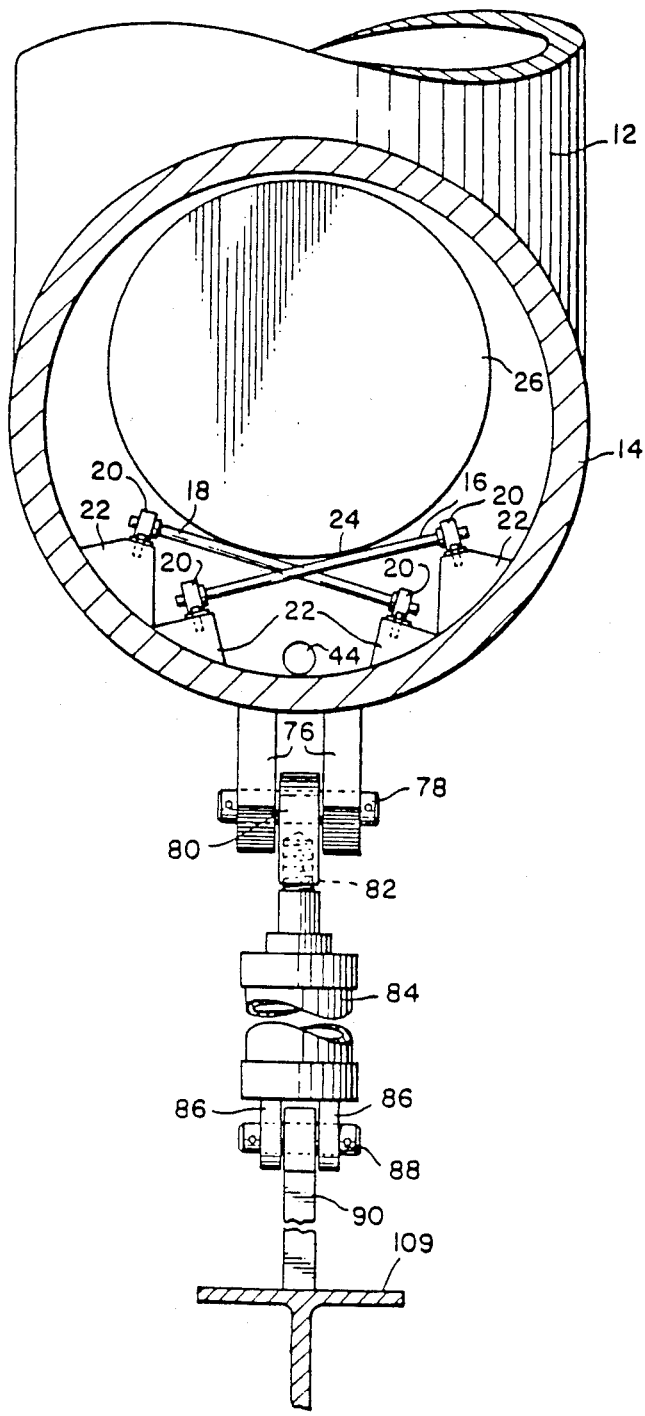
FIG. 2 is a vertical cross-sectional view, taken through a portion of the waste cylinder rupture vessel of FIG. 1, such view being taken along line 2—2 of FIG. 1, and further being taken on an enlarged scale.

Located within the bottom interior of the lower housing portion 14, and extending in rows along the elongate length thereof, are a plurality of cylindrical roller bodies 16, 18, a pair of which is shown in FIG. 2. Each cylindrical roller body 16, 18 is rotatably received at each end in a pillow block bearing 20 secured to a triangularly shaped steel plate 22 built into opposite interior walls of the bottom of the lower housing portion. The location of the triangularly shaped steel plates 22, and the pillow block bearings secured thereto, is such that the cylindrical roller bodies 16, 18 are disposed at a vertical angle between the pillow block bearings and in a direction transverse to the elongate length of the lower housing portion 14 of the cylinder rupture vessel. Adjacent cylindrical roller bodies 16, 18 are angled in equal but opposite directions, with each cylindrical roller body pair 16, 18 forming a V-shaped bearing surface 24 to cradle a target compressed gas cylinder 26. Pairs of oppositely angled cylindrical roller bodies 16, 18 extend the elongate length of the lower housing portion providing V-shaped bearing surfaces 24 capable of accommodating and accurately positioning any sized target compressed gas cylinder 26 in the center interior of the cylinder rupture vessel. The bearing surfaces so formed are also capable of withstanding the forces applied during the cylinder puncture sequence. Single unit rollers having integral bearing surfaces may be utilized instead of the pillow block arrangement. In such a case, the self centering capability is achieved by means of a V-shaped notch in the body of the roller, thus precluding the need for pillow block bearings and their associated supports.

The lower housing portion 14 of the cylinder rupture vessel is sealed at its normally open forward end 28 with an access member in the form of a circular hatch 30 retained in airtight sealing engagement by hinge means (not shown) with a slip-on flange 32 provided on the open end of the lower housing portion. A plurality of fixed toggle clamps 34, only one of which is shown in FIG. 1, are located around the periphery of the circular hatch 30 to effect a pressurized seal. Circular hatch member 30 provides communication with the interior of the cylinder rupture vessel in the form of purge connections 35 for introducing an inert gas into the vessel.

The normally open rearward end 38 of the lower housing portion 14 of the cylinder rupture vessel is sealed with a circular blind flange 40 secured to a slip-on flange 32 mounted on the lower housing portion. Bolts 42 distributed around the peripheral edge of the flanges 40, 32 retain them together, and a ring joint gasket 36 perfects the seal. The blind flange 40 is provided at is lower end with a drainage port 44 communicating with the interior of the vessel. The upper wall of the rearward end of the lower housing portion is provided with a vacuum connection 46, which is connected to a vacuum (not shown), for withdrawing air from the vessel and for evacuating the gaseous contents of a ruptured cylinder.

The upper housing portion 12 of the cylinder rupture vessel has located therein a hydraulic cylinder 48 which receives hydraulic fluid from hydraulic fluid connections 50, 52, and which accommodates a cylinder piston 54 for vertical movement therein. Referring to FIGS. 4 and 5, a puncture spike 56 having a fluted point is connected to the cylinder piston 54 by means of a rectangular block 58 which moves upwardly and downwardly with the cylinder piston and the puncture spike along a pair of cylindrical guide rods 60 that are received within the rectangular block. Spring pins 62 are provided in the upper ends of the cylindrical guide rods above the rectangular block to maintain the cylindrical guide rods in position within the rectangular block. The lower ends of the cylindrical guide rods are secured to a rectangular centering block 64 having formed in its lower elongate edge a V-shaped notch 66 and being provided with a cavity 68 through which the puncture spike 56 passes upon downward movement of the cylinder piston. A compression spring 70 surrounds each of the guide rods along their length between rectangular block 58 and V-notched centering block 64. A punch and guide block arrangement comprising four guide bars and associated compression springs may be utilized instead of the two-bar system.

The normally open upper housing portion 12 of the cylinder rupture vessel is sealed with a blind flange 72 which is provided with purge connection 74 and hydraulic fluid connections 50, 52.

Referring to FIGS. 1, 2 and 3, the forward end 28 of the lower housing portion of the cylinder rupture vessel has provided beneath it a hydraulic support assembly comprising a pair of supporting plate members 76 pivotally connected by pin member 78 to an eye member 80 located therebetween. The eye member 80 is provided at its lower end with a hollow tubular passageway which receives therein piston 82 of hydraulic cylinder 84. The lower end of hydraulic cylinder 84 is provided with a pair of eye members 86 which are pivotally connected by pin member 88 to a supporting plate member 90 located therebetween.

As is best indicated in FIGS. 1 and 3, the rearward end 38 of the lower housing portion of the cylinder rupture vessel is provided therebeneath with a structural support assembly comprising a pair of supporting plate members 92 pivotally connected by means of shaft 94 to gusset plate members 96 located adjacent to the outside face of the supporting plate members 92. The gusset plate members are centered over beams 98.

Thus, it can be seen that vertical movement of piston 82 results in upward or downward movement of the forward end of the lower housing portion in relation to its normally horizontal plane. The result of this vertical displacement is tilting of the cylinder rupture vessel along its longitudinal axis around the pivoted connections 78, 88 and 94 provided on the hydraulic and structural support assemblies. Tilting of the cylinder rupture vessel in this manner facilitates drainage of liquid from the vessel through drainage port 44.

The entire cylinder rupture vessel 10, including the hydraulic and structural support assemblies 88 and 108, is supported on a suitable base 109. Further, the cylinder rupture vessel and base are preferably enclosed in a sealed, mobile containment structure which is discussed herein in connection with FIG. 15. A closed-circuit video monitor (not shown) is preferably installed in the interior of the cylinder rupture vessel to verify puncture spike penetration of the target compressed gas cylinder.

All of the cylinder processing operations, including the purge operation, the cylinder hydraulics, the gas/liquid evacuation and the closed-circuit video monitoring are accomplished through remote operation by means of controls located outside of the vessel.

In operation, the cylinder rupture vessel 10 is loaded by opening the access member 30 located on the forward end of the vessel. Smaller target compressed gas cylinders are placed by hand or machine into the body of the vessel and positioned directly beneath the puncture spike 56. Larger target cylinders 26 are placed on the V-shaped bearing surfaces 24 formed by the cylindrical roller bodies 16, 18 located along the bottom interior of the vessel and are slid into appropriate position beneath the puncture spike. The V-shaped bearing surfaces 24 cradle the target compressed gas cylinder 26 and accurately position it in the center of the cylinder rupture vessel Once the target gas cylinder has been properly located inside the cylinder rupture vessel, the vessel is sealed by closing the access member 30. A pressurized seal is obtained through the application of the fixed toggle clamps 34 around the periphery of the hatch member.

The processing cycle is initiated by purging the air from the interior of the vessel by means of a vacuum pump (not shown) communicating with vacuum connection 46. An inert gas, generally helium or nitrogen, is introduced into the vessel through purge connections 35 and 74, until the atmosphere inside the cylinder rupture vessel is completely inert.

The hydraulic cylinder 48 is actuated through hydraulic fluid connections 50, 52 to effect downward movement of cylinder piston 54 and rectangular block 58 so that the V-notched centering block 64 is resting against the upper wall of the target cylinder 26 located beneath it. Further downward travel of the cylinder piston 54 results in the downward movement of the rectangular block 58 along the cylindrical guide rods 60 against the force of compression springs 70 so that the puncture spike is guided through the cavity in the V-notched centering block to puncture both the upper and lower walls of the target compressed gas cylinder.

Any liquids in the cylinder rupture vessel following the rupture sequence are allowed to drain through drainage port 44. Drainage is facilitated by activating hydraulic cylinder 84 which forms part of the hydraulic support assembly beneath the forward portion of the vessel. Activation of the cylinder 100 and piston 82 results in the forward portion of the vessel moving upwardly or downwardly in relation to its horizontal plane, causing the vessel to tilt along its longitudinal axis around the pivoted connections 78, 88 and 94 provided on the support assemblies.

Gases released into the cylinder rupture vessel following the puncture operation are evacuated through the vacuum connection 46 by means of a vacuum in series with a compressor (not shown). The extracted gas can be sampled, recontainerized, and staged for proper disposal, or treated on site. Subsequently, inert gas is reintroduced into the vessel as a purge until the atmosphere therein is again completely inert.

Figure 8:
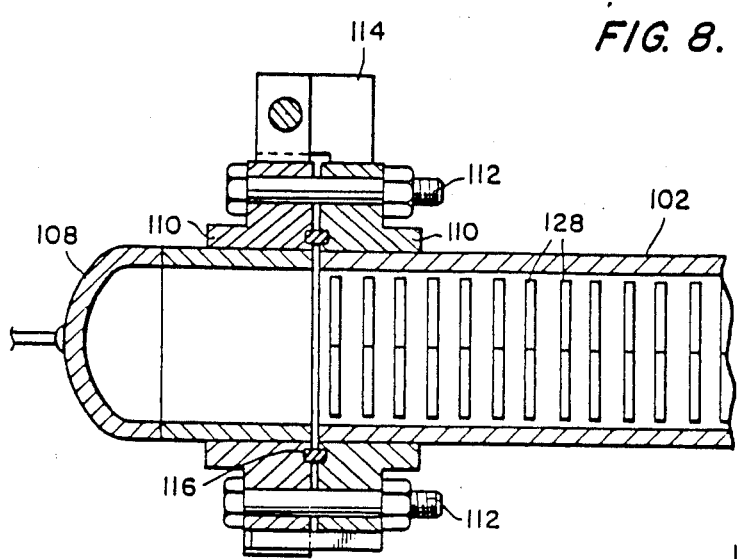
FIG. 8 is a horizontal cross-sectional view of a fragment of the rupture vessel of FIG. 6, such view being taken along line 8—8 in FIG. 6 and in the direction indicated.
Figure 7:
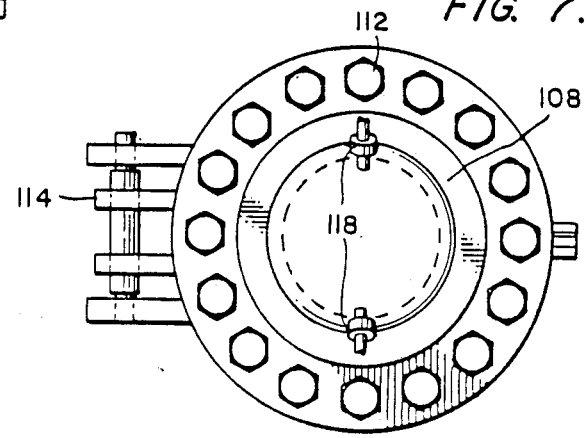
FIG. 7 is an end elevational view of a fragment of the rupture vessel of FIG. 6, such view being taken along line 7—7 in FIG. 6 and in the direction indicated, and further being taken on an enlarged scale.
Figure 9:
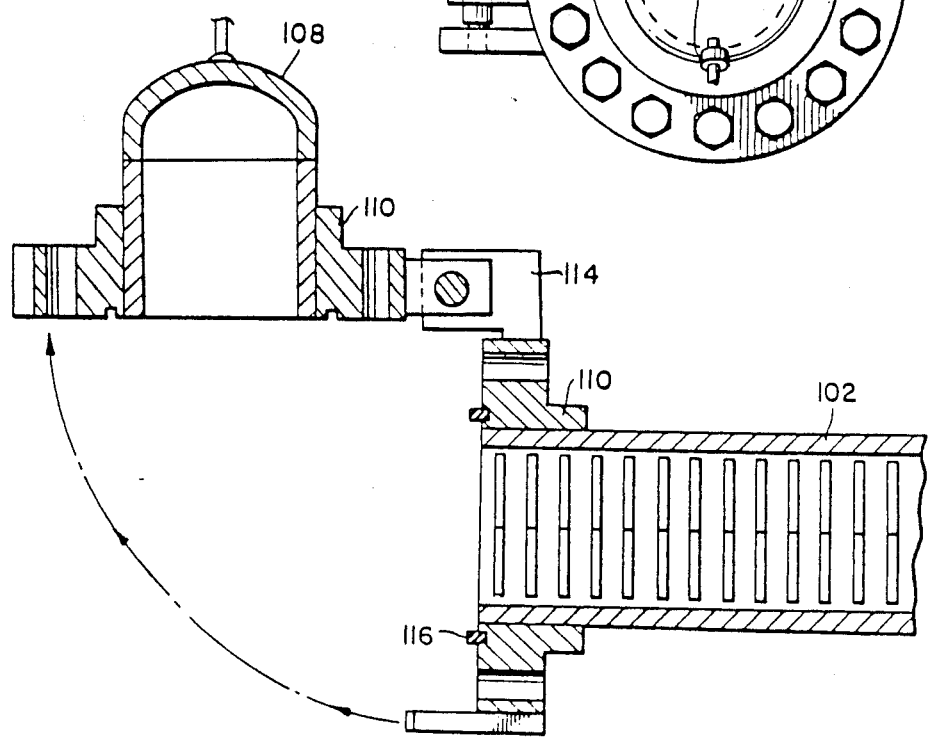
FIG. 9 is a view similar to FIG. 8, but showing the cylindrical closure of the waste cylinder rupture vessel being pivoted to its opened position.

Referring to FIGS. 6–10 of the drawings, there is shown a second alternative embodiment of the cylinder rupture vessel of the present invention. The cylinder rupture vessel shown in FIG. 6 comprises a pressure vessel housing having a cylindrically shaped upper housing portion 100 integral with and disposed vertically above a horizontal cylindrically shaped lower housing portion 102. The lower housing portion 102 differs from lower housing portion 14 of the cylinder rupture vessel of FIG. 1 in that lower housing portion 102 is of greater elongate length for receiving therein a target compressed gas cylinder 104 of substantial length. Lower housing portion 102 differs further from lower housing portion 14 in that it is sealed at its normally open forward end 106 with a cylindrical closure 108. Cylindrical closure 108 is secured t the lower housing portion by means of slip-on flanges 110 provided, respectively, on the cylindrical closure and on the forward open end of the lower housing portion. The slip-on flanges 110 are secured to each other by means of bolts 112 located around the peripheral edge of the flanges As is best illustrated in FIGS. 7 and 8, slip-on flanges 110 are hingedly connected to each other by hinge means 114, which provides access to the interior of the lower housing portion by movement of cylindrical closure 108 to the position shown in FIG. 9. The configuration of cylindrical closure 108 is such that it can be closed over, and receive therewithin, the forward end of a target compressed gas cylinder 104. A ring joint gasket 116 at the cylindrical closure-vessel interface perfects the seal. Purge connections 118 for introducing an inert gas are provided in the outside wall of the cylindrical closure.

Lower housing portion 102 is closed at its rearward end 120 and has formed therein an observation port 122. The upper wall of the lower housing portion is provided at the rearward end with a vacuum connection 124 for purging air from the cylinder rupture vessel and for evacuating any gases released during the puncture sequence. A drainage port 126 is provided in the bottom wall of the rearward end of the lower housing portion for removing any liquids from the vessel.

Referring to FIGS. 6 and 8, located within the bottom interior of the lower housing portion, and extending in uniform rows along the elongate length thereof, are a plurality of vertical plates 128, the upper edges of which are in the shape of a shallow "V". The shallow V-shaped edges form bearing surfaces upon which rests a target compressed gas cylinder.

Upper housing portion 100 of the cylinder rupture vessel of FIG. 6 is similar to upper housing portion 12 of the cylinder rupture vessel of FIG. 1. As depicted in FIGS. 6 and 10, upper housing portion 100 has located therein a hydraulic cylinder 130 and piston 132 to which is secured a punch assembly, indicated generally at insert 10, which is shown on an enlarged scale in FIG. 10. The punch assembly is similar to the puncture spike 56 discussed in conjunction with the cylinder rupture vessel of FIG. 1 and comprises a punch member 134 secured to piston 132 by means of rectangular block 136 which moves vertically with the piston along cylindrical guide rods 138 against the force of compression springs 140. The lower ends of the guide rods are received within a rectangular centering block 142 shown in FIG. 10 as guiding the punch member as it punctures the upper wall of target compressed gas cylinder 104.

The normally open upper housing portion 100 of the cylinder rupture vessel is sealed with a blind flange 144 secured by bolts 112 to a slip-on flange 110 mounted on the upper housing portion. Ring joint gasket 116 retains the flanges in airtight sealing engagement. Blind flange 144 is provided with hydraulic fluid connection 146 for supplying hydraulic fluid to hydraulic cylinder 130.

The forward end 106 of the lower housing portion 102 has provided therebeneath a hydraulic support assembly 148. The rearward end 120 of the lower housing portion has provided therebeneath a structural support assembly 150. Hydraulic and structural support assemblies 148, 150 have already been described in detail in conjunction with the hydraulic and structural support assemblies of the cylinder rupture vessel of FIG. 1. Thus, the forward end of the cylinder rupture vessel of FIG. 6 may be raised or lowered in relation to its horizontal plane, resulting in tilting of the unit around the pivoted connections provided on the hydraulic and structural support assemblies.

A third alternative embodiment of the instant invention is illustrated in FIGS. 11-14. The cylinder rupture vessel of FIG. 11 comprises a pressure vessel housing having a cylindrically shaped upper housing portion 152 integral with and disposed vertically above a horizontal cylindrically shaped lower housing portion 154.

Lower housing portion 154 is sealed at its normally open forward end 156 by means of hatch member 158 having hinge means (not shown). The upper wall of the forward end of the lower housing portion is provided with purge connection 160 for the introduction of inert gas into the cylinder rupture vessel interior.

The rearward end 162 of the lower housing portion is sealed by means of an integral hemispherical end cap 164. The upper wall of the lower housing portion is provided at the rearward end with vacuum connection 166 for accomplishing the air purge and gas evacuation operations. The top surface of the lower housing portion wall is provided at both the forward and rearward ends with a lifting lug 168.

Figure 13:
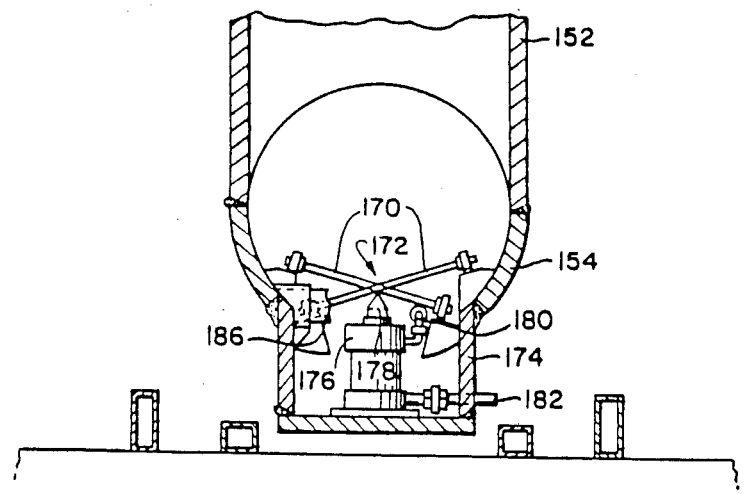
FIG. 13 is a front elevational view of the lower punch member utilized within the waste cylinder rupture vessel of FIG. 11, such view being taken along line 13—13 of FIG. 11, and further being taken on a reduced scale.

As seen in FIGS. 11 and 13, the bottom interior of the lower housing portion 154 has located therein along its elongate length a plurality of angled cylindrical roller bodies 170, a pair of which is shown in FIG. 13. Each pair of adjacent cylindrical roller bodies forms a V-shaped bearing surface for acceptance of a target compressed gas cylinder 172 (not shown), as previously discussed in detail in connection with the cylinder rupture vessel of FIG. 1.

The bottom wall of the lower housing portion of the cylinder rupture vessel of FIG. 11 is interrupted by an integral cylindrical housing portion 174 depending vertically therefrom and being closed at its lower end by means of a flange plate 173. The flange plate is connected to and supported with respect to the integral cylindrical housing portion by means of a plurality of gusset plates 175 which are shaped so as to provide a passage for the free movement of liquids around them on the interior of the integral cylindrical housing portion.

Located within the integral cylindrical housing portion 174 beneath the V-shaped bearing surfaces is a hydraulic cylinder and piston arrangement 176 which communicates with lower punch member 178 to transmit upward vertical movement thereto for puncturing the bottom wall of a target compressed gas cylinder which rests upon the V-shaped bearing surfaces and which is held down against the upward force of the lower punch by the concurrent downward force of the upper punch and guide block arrangement. Hydraulic fluid is supplied to the hydraulic cylinder and piston through hydraulic fluid connections 180, 182 located in the bottom wall of the lower housing portion. A drainage port 184 is located in the side wall of the integral cylindrical housing portion.

Disposed below the V-shaped bearing surfaces on each side of the lower punch member are safety stops 186, only one of which is shown in FIG. 13, secured to the interior wall of the lower housing portion by means of brackets (not shown) welded thereto. The safety stops serve to prevent significant downward deflection of the roller bearings due to the application of force by the upper punch member 188. They are so positioned as to allow only negligible deflection in the rollers before the body of the cylinder contacts the safety stops, thereby preventing significant downward deflection and subsequent permanent damage to the roller bearings.

Upper housing portion 152 of the cylinder rupture vessel is of reduced vertical height compared with upper housing portion 12 of the cylinder rupture vessel of FIG. 1 and is provided in its interior with an upper punch member 188 actuated by hydraulic cylinder and piston 190, as has already been described in relation to the puncture spike of the cylinder rupture vessel of FIG. 1. The normally open upper housing portion 152 is sealed by means of a blind flange 200 secured by bolts 202 to a slip-on flange 204 provided on the upper housing portion. An airtight seal is perfected by ring joint gasket 206. Blind flange 200 is provided with hydraulic fluid connections 208, 210 for supplying hydraulic fluid to the upper punch member and purge connection 212 for introducing inert gas into the vessel.

Referring to FIGS. 11 and 12, extending from each of the side walls of the forward end of lower housing portion 154 are a pair of hydraulic support assemblies each comprising a hydraulic cylinder 214 and piston 216 with the lower end of the hydraulic cylinder being pivotally secured by means of a clevis pin 218 to a supporting plate 220. The upper end of the piston is received within a clevis member 222, each clevis member being pivotally received on a shaft member 224 secured to the outer side wall of the lower housing portion. Each shaft member accepts the opposite end of a steel saddle 226 upon which rests the forward end of the lower housing portion.

Figure 14:
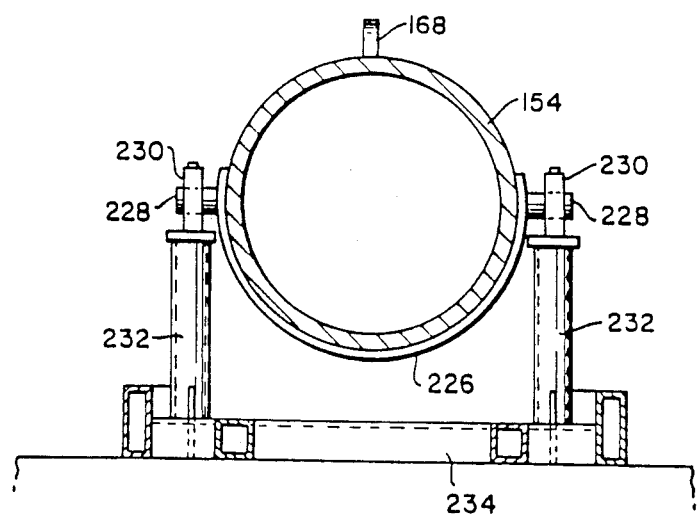
FIG. 14 is a vertical cross-sectional view taken through a portion of the waste cylinder rupture vessel of FIG. 11, such view being taken along line 14—14 of FIG. 11 and further being taken on a reduced scale.

Rearward end of lower housing portion 154 has provided therebeneath a pair of structural support assemblies that are best shown in FIGS. 11 and 14 as extending from the outer side walls of the rearward end. Each structural support assembly comprises a shaft member 228 located on each side of the outer side walls of the rearward end of lower housing portion 154. Shaft members 228 receive opposite ends of a steel saddle 226 upon which rests the rearward end of the lower housing portion. Rectangular block members 230 are situated above supporting cylindrical pipe members 232 and pivotally receive the shaft members, which are secured therein.

Activation of the hydraulic cylinder 214 results in vertical movement of the piston 216, causing the forward end of the cylinder rupture vessel to be vertically displaced in relation to its horizontal plane. This vertical displacement results in the cylinder rupture vessel being tilted about the pivoted connections 218, 224 and 228 provided on the hydraulic and structural support assemblies, thus facilitating the exit of liquids from the vessel through the drainage port.

The entire cylinder rupture vessel, including the hydraulic and structural support assemblies, is positioned on a frame 234 which is capable of being levelled by means of the hydraulic cylinder and piston, causing the end of the frame to which they are connected to be displaced in a vertical direction about the pivot point 238 provided in the frame at its opposite end.

A preferred embodiment for the cylinder rupture vessel is illustrated in FIGS. 15–20. The cylinder rupture vessel, best depicted in FIGS. 16 and 19, comprises a pressure vessel housing having a cylindrically shaped first upper housing portion 310 in the form of a vertical riser integral with and disposed vertically above a horizontal cylindrically shaped lower housing portion 312.

Lower housing portion 312 is sealed at its normally open forward end by means of a quick-opening closure 314 which provides access to the interior of the lower housing portion for purposes of introducing a target cylinder. The closure is manufactured to ASME code specifications and is sealed by rotating an outer locking ring over wedges located on the hatch. An O-ring completes the pressure sealing surface of the hatch. The upper wall of the forward end of the lower housing portion is provided with purge connection 316 for introducing inert gas or liquid solvent into the cylinder rupture vessel interior. A similar purge port 317 is located near the top of the upper housing 310.

The fixed rearward end of the lower housing portion is sealed by means of an ASME deep dish head 318. The upper wall of the lower housing portion is provided at the rearward end with vacuum withdrawal port 320 for accomplishing the air purge and gas evacuation operations.

Figure 17:
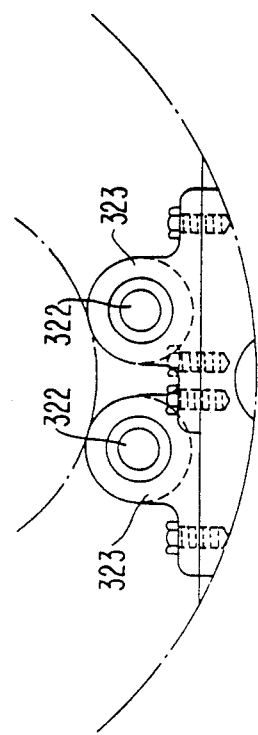
FIG. 17 is a partial front sectional view of the supporting rollers and bearings, with a target cylinder shown in phantom being supported thereon.

As indicated in FIGS. 16, 17 and 18, the bottom interior of the lower housing portion 312 has located therein along its elongated length a pair of rollers 322, which together form a bearing surface for supporting a target cylinder as previously discussed in detail in connection with the alternative embodiments.

The rollers are supported by bearings 323 and are adapted to be driven, as by motor 324, depicted in FIG. 16, for rotation in the same direction so as to cause the target cylinder to rotate about its longitudinal axis. The target cylinder, shown in phantom in FIG. 17, is thus capable of being inverted subsequent to the puncture operation in order to facilitate drainage of any liquids from the punctured cylinder. The bottom wall of the lower housing portion 312 at its rearward end is provided with a drainage or liquid draw-off port 326 for draining liquid released by the cylinder from the pressure vessel housing.

First upper housing portion 310 of the cylinder rupture vessel is provided in its interior with a hydraulic drill assembly 328. The drill assembly is fitted with an extendable shaft adapted to lower the drill bit, which is extendable to the target cylinder location. The drill assembly is operatively associated with a gear-driven dovetail slide 330 which allows for complete retraction of the drill assembly into the first upper housing portion. The first upper housing portion includes, additionally, a pair of hydraulic pistons 332, each of which activates a V-shaped clamp 334. FIG. 21 depicts one of the clamps, which comprises a pair of leg members 336. The V-shaped clamps are connected to each other by means of horizontal stabilization bars 338, extending between the leg members of respective V-shaped clamps as shown in FIG. 16. The clamps are adapted to be lowered by means of the pistons 332 over a target cylinder. Downward pressure from the clamps upon the cylinder serves to immobilize the cylinder upon the supporting rollers.

The upper end of the first upper housing portion is sealed by means of a blind flange 340. Several hydraulic access ports 342 or hydraulic fluid connections are provided in the side wall of the first upper housing portion, as shown in FIG. 19, for supplying hydraulic fluid to the drill assembly, dove tail slide motor and clamp pistons.

A second vertical riser or second upper housing portion 343 may be provided to extend vertically upward from the lower housing portion. The second upper housing portion is adapted to accommodate a rupture disk assembly (not shown) to lead to a second pressure vessel housing (not shown) so as to increase the effective available volume of the cylinder rupture vessel system. The upper end of the second upper housing portion is sealed by means of a blind flange 344.

Figure 19:
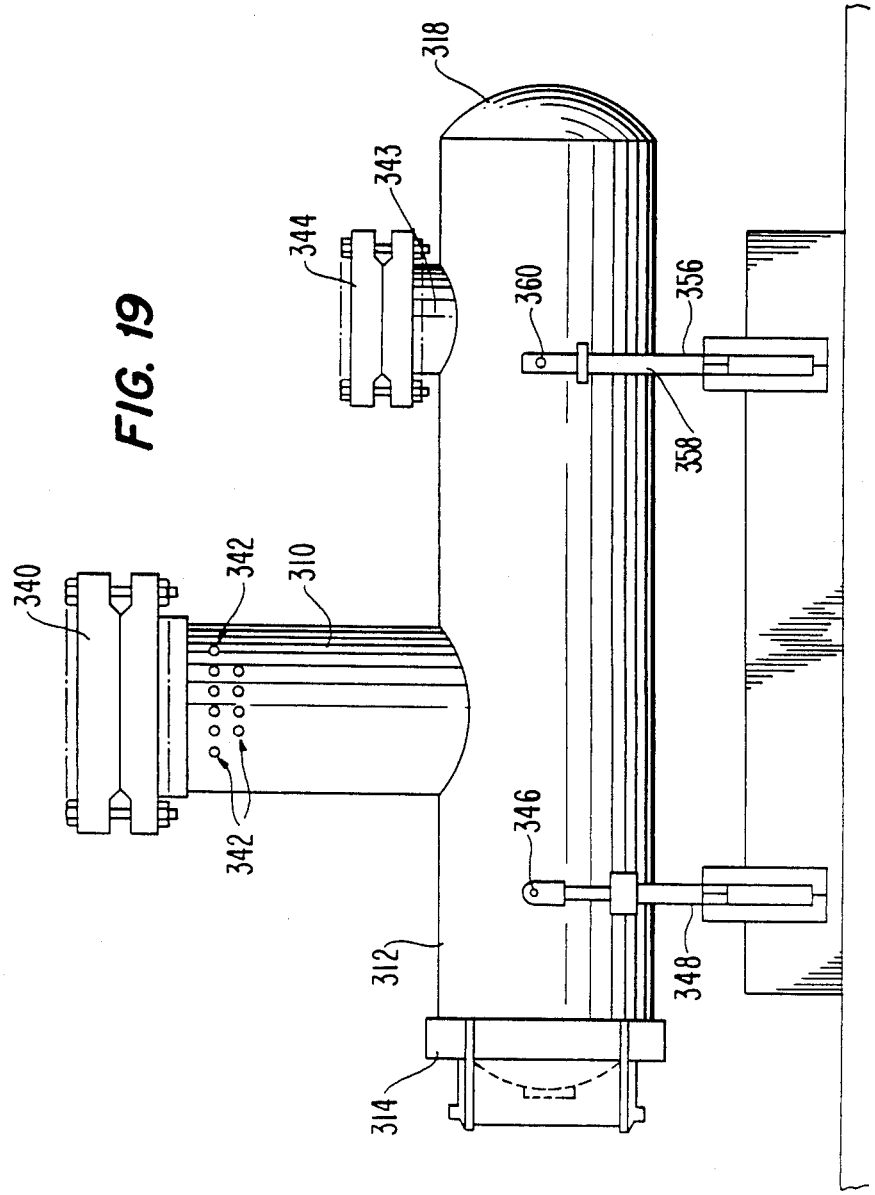
FIG. 19 is a side plan view of the cylinder rupture vessel, hydraulic support assembly, structural support assembly and frame.

With particular reference to FIGS. 18 and 19, opposite side walls of the forward end of lower housing portion 312 are pivotally associated at 346 with a pair of hydraulic support assemblies 348, each comprising a hydraulic cylinder 350 and piston 352. The lower end of the cylinder 350 is pivotally secured at 354 so as to be capable of rotation with respect to the frame 362.

The rearward end of the lower housing portion is supported by a pair of structural support assemblies 356 which support and hold the rearward end of the lower housing portion in relation to the frame 362. Each structural support assembly comprises a pipe or shaft member 358 operatively and pivotally secured at 360 to the side walls of the rearward end of the lower housing portion.

Activation of the hydraulic cylinders 350 results in vertical movement of the pistons 352, causing the forward end of the cylinder rupture vessel to be vertically displaced in relation to its horizontal plane. This vertical displacement results in the cylinder rupture vessel being tilted about the pivoted connections 346, 354 and 360 provided on the hydraulic and structural support assemblies, thereby facilitating the exit of liquids from the vessel through the drainage port.

Figure 20:
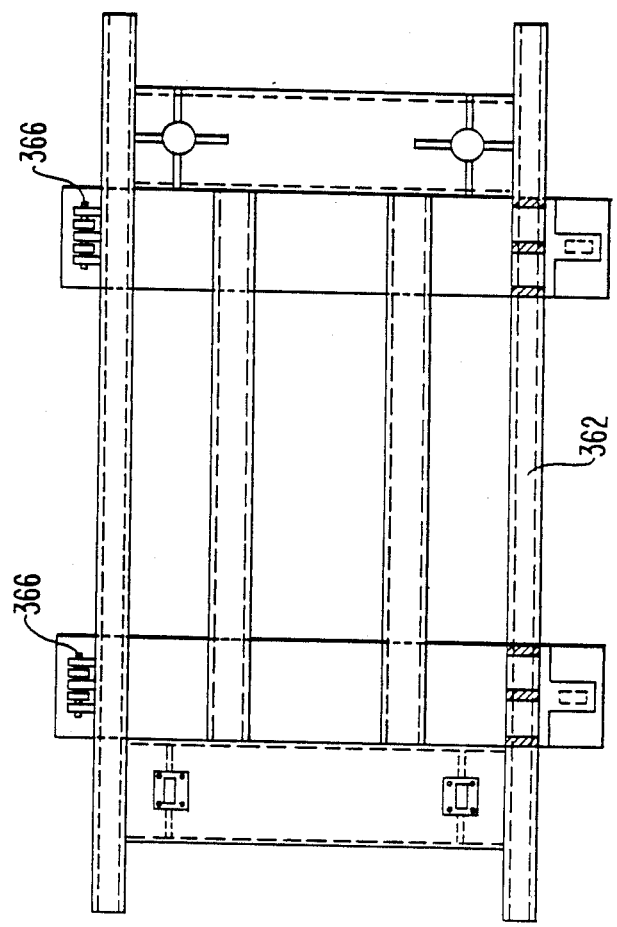
FIG. 20 is a top plan and partial sectional view of the frame taken along line 20—20 of FIG. 18.

The entire cylinder rupture vessel, including the hydraulic and structural support assemblies, is positioned on a frame 362, particularly illustrated in FIG. 20. The frame 362 is capable of being levelled by means of a hydraulic cylinder and piston assembly 364, a pair of which is provided on one side of the frame. The cylinder and piston assemblies 364 are adapted to raise the side of the frame to which they are connected in a vertical direction about a pair of pivot points 366 provided on the opposite side of the frame.

Figure 15:
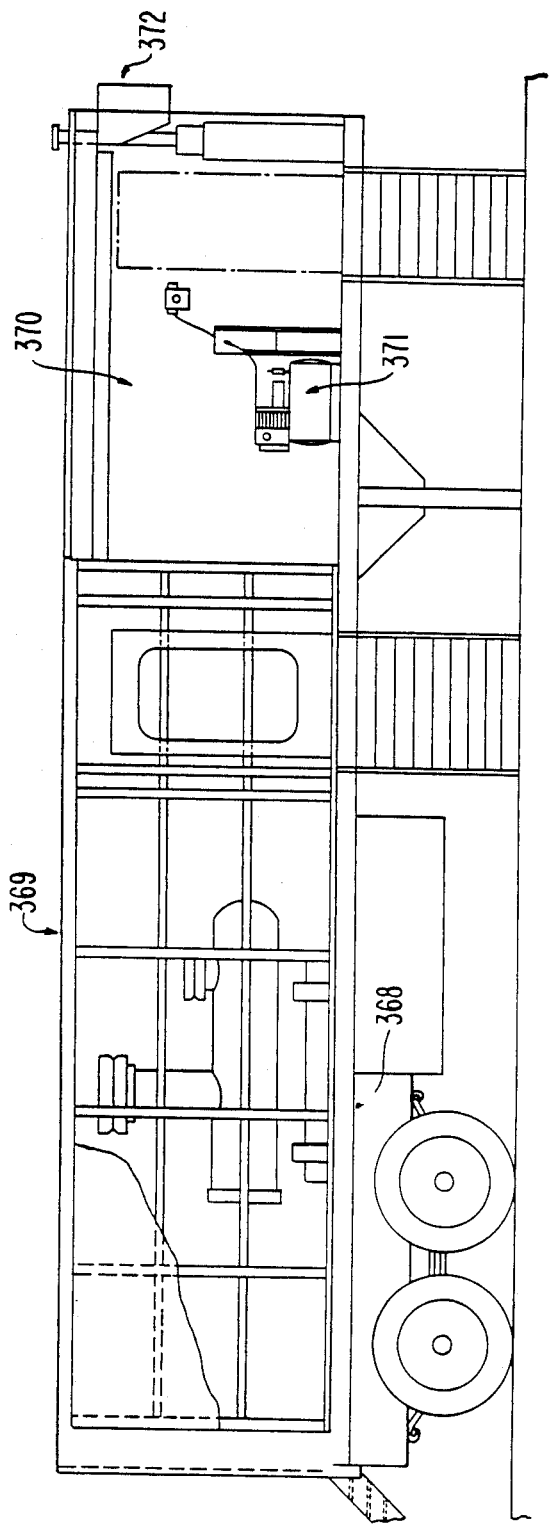
FIG. 15 is a side plan view, partly broken away, showing the cylinder rupture vessel disposed within the semi-van containing the vacuum and compressor systems, and also showing a cut-away of the sealed containment room housing the cylinder rupture vessel and its components.

As shown in FIG. 15, the entire cylinder rupture vessel, and the vacuum and compressor systems, are disposed in a pressure-tight room inside of a semi-van 368. The room is constructed of ¼ inch metal plate reinforced with steel tubing. The room is fitted with pressure-tight hatches for entry and exit. The room is adapted to contain any leakage from the system. All fixtures within the room are rated for operation in explosive environments.

The pressure-tight containment room 369 is isolated from a mechanical system and storage area 370. The hydraulic power unit 371 and heating/cooling system 372 are located in this area. The hydraulic system is piped into the containment room 369 by means of sealed, stainless steel tubing sealed to the containment room walls. The hydraulic fluid employed for powering the cylinder rupture vessel is of a chlorotrifluoroethylene type, or other non-reactive type, so that, should a leak occur within the cylinder rupture vessel, the oil will be non-reactive.

It is apparent from the foregoing that the embodiments of the invention and the specific components described herein for illustrative purposes are but a few of those which fall within the scope and range of the invention. The foregoing description is made only by way of example and not as a limitation to the scope of the invention.

What is claimed is:

1. A cylinder rupture vessel comprising:
   an enclosed chamber;
   means for gaining access to the interior of the chamber;
   a pair of rollers disposed along the elongate length of the chamber adapted to support thereon a target container to be ruptured;
   means for sealing the chamber;
   drill means disposed within the chamber for puncturing at least one wall of the target container;
   clamp means for immobilizing the container on the pair of rollers;
   at least two inlet purge connections communicating with the interior of the chamber and adapted to purge the gases therein;
   at least one vacuum connection communicating with the interior of the chamber and adapted to evacuate the gases therein and the gases released into the chamber by the punctured target container; and
   at least one drainage port communicating with the interior of the chamber and adapted to drain from the chamber the liquids released by the punctured target container.

2. The cylinder rupture vessel as recited in claim 1 wherein said pair of rollers are adapted to be rotated so as to cause said target container supported thereon to be inverted.

3. The cylinder rupture vessel as recited in claim 1 wherein said clamp means comprises at least a pair of inverted V-shaped clamps, said clamps being connected together by means of horizontal stabilization bars, said clamps being adapted to be lowered toward said target container by means of a hydraulic cylinder and piston.

4. The cylinder rupture vessel as recited in claim 1, wherein said enclosed chamber includes a substantially vertical upper housing and a substantially horizontal lower housing integral with the upper housing.

5. The cylinder rupture vessel as recited in claim 4 wherein said enclosed chamber is further defined by a second upper housing portion integral with and disposed vertically in relation to a horizontal lower housing portion, said second upper housing portion being adapted to communicate with a second vessel.

6. A cylinder rupture vessel comprising:
   an enclosed chamber including a substantially vertical upper housing and a substantially horizontal lower housing integral with the upper housing;
   a target container supported within the enclosed chamber, said target container being capable of containing at least one of high-pressure gas and high-pressure, reactive gas;
   means for sealing the enclosed chamber;
   inlet means for introducing an inlet gas into the chamber to purge the air from the chamber;
   outlet means for purging the air, including the inert gas, from the chamber; and
   puncture means disposed within the chamber for puncturing at least one wall of the target container.

7. The cylinder rupture vessel as recited in claim 6 wherein said bearing means comprises a plurality of V-shaped bearing surfaces.

8. The cylinder rupture vessel as recited in claim 6 further including a plurality of clamp means for maintaining the cylindrical closure in engagement with the lower housing.

9. The cylinder rupture vessel as recited in claim 6, further including means for gaining access to the interior of the chamber, said access means comprising a cylindrical closure secured to an open end of the lower housing by hinge means.

10. The cylinder rupture vessel as recited in claim 6, wherein said puncture means is disposed entirely within said upper housing except upon operation when said puncture means enters said lower housing to puncture said target container.

* * * * *

UNITED STATES PATENT AND TRADEMARK OFFICE
CERTIFICATE OF CORRECTION

PATENT NO. : 4,944,333

DATED : July 31, 1990

INVENTOR(S) : Jeffrey W. Gold and Dan A. Nickens

It is certified that error appears in the above-identified patent and that said Letters Patent is hereby corrected as shown below:

Claim 6, column 14, line 56, change "inlet" (second Occur,) to --inert--.

Signed and Sealed this

Twenty-second Day of October, 1991

Attest:

HARRY F. MANBECK, JR.

*Attesting Officer*　　　*Commissioner of Patents and Trademarks*